United States Patent [19]

Mezzedimi

[11] 4,054,260
[45] Oct. 18, 1977

[54] DEVICE FOR CONTROLLING THE FLOW OF FLUIDS, PARTICULARLY CORROSIVE AND POLLUTING FLUIDS

[75] Inventor: Vasco Mezzedimi, Poggibonsi (Siena), Italy

[73] Assignee: Nuovo Pignone S.P.A., Italy

[21] Appl. No.: 653,585

[22] Filed: Jan. 29, 1976

[30] Foreign Application Priority Data

Jan. 29, 1975 Italy .................. 19701/75

[51] Int. Cl.$^2$ ............................ F16K 31/53
[52] U.S. Cl. ................... 251/80; 251/249.5
[58] Field of Search ........... 137/493, 493.9; 251/80, 251/229, 248, 249.5, 250.5, 267, 268, 269, 77, 79

[56] References Cited

U.S. PATENT DOCUMENTS

| | | | |
|---|---|---|---|
| 863,180 | 8/1907 | Howard | 251/77 |
| 2,222,699 | 11/1940 | Ball | 251/267 |
| 2,391,898 | 1/1946 | Hobbs | 251/267 |
| 2,496,740 | 2/1950 | Morey | 251/77 |
| 2,642,890 | 6/1953 | Skewis | 251/248 |
| 2,879,786 | 3/1959 | Heideman | 137/493.9 X |
| 3,053,461 | 9/1962 | Inglis | 251/80 X |
| 3,073,566 | 1/1963 | Bredtschneider | 251/269 |
| 3,455,331 | 7/1969 | Baumann et al. | 251/80 X |
| 3,653,402 | 4/1972 | Dunkelis | 137/493 |
| 3,923,282 | 12/1975 | Henzler | 251/77 |
| 3,934,612 | 1/1976 | Kast | 251/77 |

*Primary Examiner*—Martin P. Schwadron
*Assistant Examiner*—G. L. Walton
*Attorney, Agent, or Firm*—Morgan, Finnegan, Pine, Foley & Lee

[57] ABSTRACT

The invention relates to a mechanical device for the cut-off of fluid, particularly suitable for corrosive and polluting fluids, comprising an annular sealing member of packing displaceable towards and against the seal seating by means of a series of screw pins acting on the sealing member through a series of springs; each screw pin is only displaceable along its axis but not rotatable and has the thread thereof engaged with a threaded part of a corresponding pinion, all the pinions being rotatable by means of only one gear, whereby the rotation of said gear causes the screw pins and thus the sealing member to be displaced towards and against the sealing seat, the displacement in the opposite direction being only possible upon said gear is rotated in the opposite direction.

3 Claims, 1 Drawing Figure

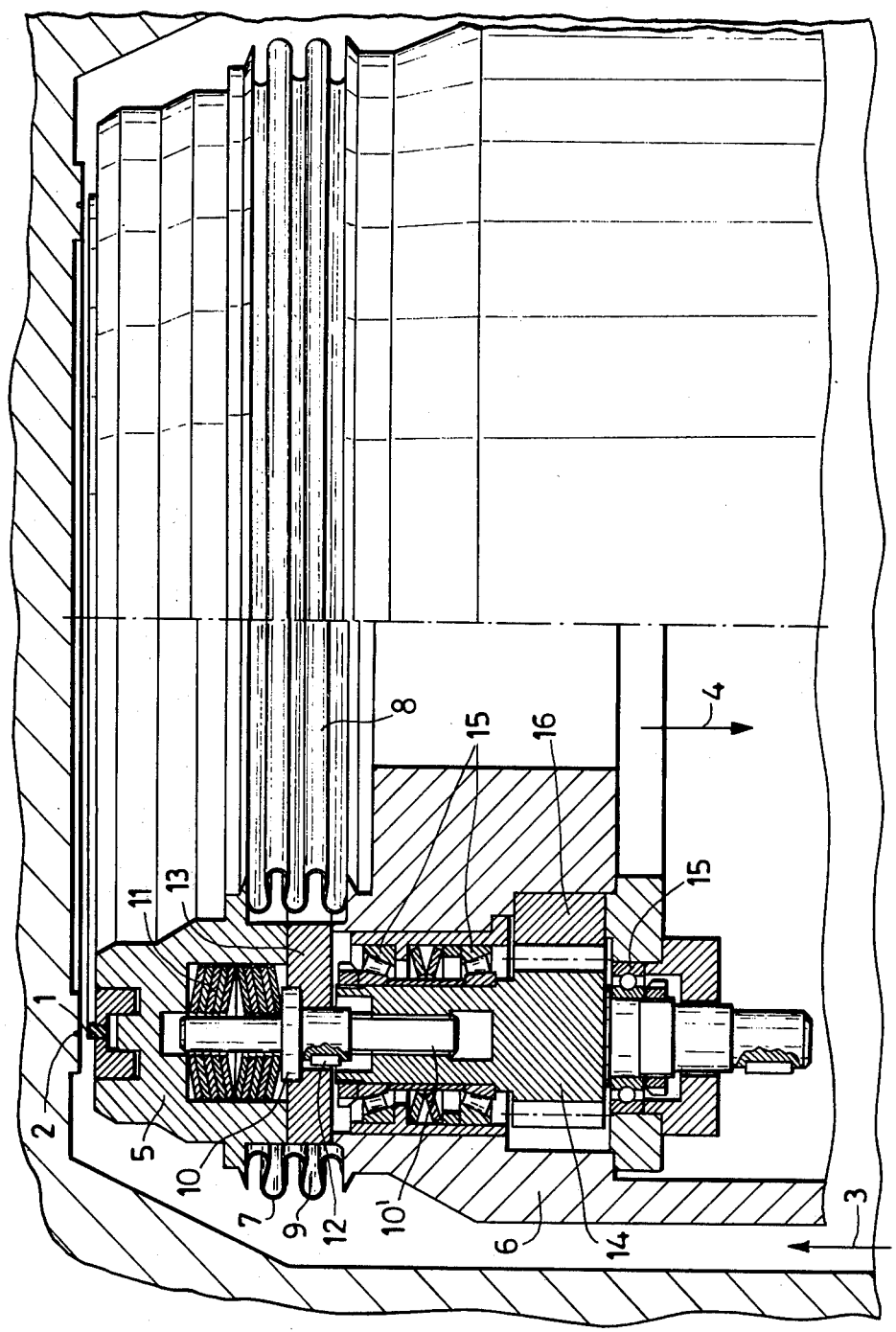

DEVICE FOR CONTROLLING THE FLOW OF FLUIDS, PARTICULARLY CORROSIVE AND POLLUTING FLUIDS

The present invention relates to a mechanical device for the cut-off of a fluid by means of the displacement of a sealing member or packing against its seal seating, by which:

the possibility is afforded of applying specific pressures onto the seal member, the pressures being also very high in order to obtain an effective seal;

the tightness is also maintained when the seating of the seal member is subjected to displacements;

the displacements of the seal member are irreversible, whereby only willingly the seal member can be moved away from its seal seating and the opening can be effected;

the tightness of the control devices of the apparatus is ensured, in order to assure the maximum life of said devices, even in the presence of polluting or corrosive fluids;

the possibility is afforded of a remote control.

Such a mechanical device for the cut-off of the fluid, besides being useful for a number of general equipments, can be employed at best in the nuclear field and more specifically in the compressors utilized in the compression of uranium hexafluoride gases to obtain their enrichment by means of gaseous diffusion. In said compressors, in fact, in order to carry out the maintenance operations, the polluting and corrosive uranium hexafluoride gas must be absolutely certainly cut-off, before the machine is acted on. In the prior art several types of cut-off device of a fluid are known, but all these known devices do not show all the above mentioned features.

The mechanical device for the cut-off of a fluid by means of the irreversible displacement of a sealing member or annular packing against its seal seating, according the present invention, is characterized in that the sealing member or annular packing supported by a rigid packing-holder ring, is displaced against its seal seating by a series of screw pins annularly and vertically acting from underneath against said rigid ring through a series of springs lodged in said ring, said screw pins being slidable, but not rotatable, along their axes owing to integral keys, slidably positioned in corresonding splines formed in the fixed part of the device and being each one engaged in the internal thread of an externally toothed pinion, the external teeths of all said pinions being engaged with only one gear. In such a way, in fact, the rotation of said gear and consequently of the pinions which are geared thereto permits said screw pins to come out of the corresponding pinions and therefore said seal packing or member to be displaced towards and against said seal seating whereby an effective cut-off of fluid is obtained, since the mechanical devices utilized allow whatever desired value of sealing pressure to be achieved and absolutely prevent the packing from being oppositely displaced, unless desired, namely by rotating the said gear in the opposite direction. On the other hand, by the spring elastic connection between said screw pins and said packing holder ring the seal is maintained, even in the case the seal seating should undergo displacements of any kind and direction.

According to an other feature of the invention, said rigid packing holder ring is tightly connected to the rigid part of the device by an outer deformable casing, consisting for instance of two elastic annular bellows, whereby said springs, said screw pins and the related pinions are contained in the inside of the casing.

Thus no possibility exists that the mechanical members come into contact with the fluid which must be cut-off and the device can be also employed for the cut-off of corrosive and polluting fluids.

The invention is now better clarified with reference to the enclosed drawing which shows a preferred embodiment given only as a non limitative example, such technical and constructive modifications may be effected without departing from the scope of the present invention.

In said drawing, the FIGURE shows a partial crossection and frontal view of the mechanical device for the cutoff of a fluid according to the invention.

In said figure, by 1 is indicated the annular seat member 5 or packing by which, through the cooperation with the seal seating 2, the flow of the fluid from inlet 3 to the outlet 4 is to be cut-off. Said seal member is supported by an annular packing holder ring 5 which is tightly connected to the fixed part 6 of the device by two annular elastic bellows 7 and 8, whereby an annular chamber 9, is thus defined. The annular ring 5 is vertically displaceable by means of a series of screw pins 10 which, being annularly positioned inside said chamber 9, act on said ring by means of a like series of springs 11. Every screw pin 10 is only vertically displaceable but not rotate due to an integral key 12 which is inserted in a vertical spline formed in the block 13 rigidly connected to the fixed part 6 of the device. The threaded part 10' of each screw pin 10 is engaged with the internal thread of a externally toothed pinion 14, which is rotatably supported through ball bearings 15 by the fixed part 6 of the device.

All the toothed pinions 14 are geared to only one driving gear 16 mounted to the said fixed part 6, which can be remotely driven by a motor through known gearing systems, not shown in the figure.

I claim:

1. A device for controlling the flow of fluid by moving an internal annular sealing member to and from its annular sealing seat on an outer housing to control the flow of fluid from between the housing and the device, across the sealing seat and member, and into and through the device, comprising:

a displaceable rigid holder ring within the housing which supports the annular sealing member, a series of annular springs lodged underneath and within said ring for urging the annular sealing member against its annular sealing seat, a series of vertically spaced moving pins having one end positioned annularly underneath said ring and engagement with said annular springs, each of said pins having an integral key intermediate its ends and being threaded at its other end, an annular fixed part beneath said ring having a plurality of internal vertically spaced splines in which said keys are slidably positioned to allow only slidable movement of said pins, a series of annularly spaced externally toothed pinions housed within said fixed part having internal threads for engagement with said threaded ends of said pins, and an annular driving gear mounted within said fixed part which engages said pinions for rotation thereof to cause sliding movement of said pins, whereby rotation of said gear in one direction causes rotation of said pinions geared thereto and displacement of said engaged pins toward said ring and against said annular springs to thereby move said ring and annular sealing member to its seat to cut off fluid flow from between the housing and the device into and through the device, and whereby rotation of said gear in the other direction causes rotation of said pinions geared thereto to thereby displace said engaged pins away from said ring and said annular springs to thereby move said ring and annular sealing member from its annular sealing seat to allow fluid flow from between the housing and the device into and through the device.

2. The cut off device of claim 1 including deformable annular inner and outer casings which tightly connect said ring to said fixed part, and wherein said springs, pins and pinions are contained within said casings.

3. A device for controlling the flow of corrosive fluid by moving an internal annular sealing member to and from its annular sealing seat on an outer housing to control the flow of corrosive fluid from between the housing and the device, across the sealing seat and member, and into and through the device, comprising:

a displaceable rigid holder ring within the housing which supports the annular sealing member, a series of annular springs lodged underneath and within said ring for urging the annular sealing member against its annular sealing seat, a series of vertically spaced movable pins having one end positioned annularly underneath said ring and engagement with said annular springs, each of said pins having an integral key intermediate its ends and being threaded at its other end, an annular fixed part beneath said ring having a plurality of internal vertically spaced splines in which said keys are slidably positioned to allow only slidable movement of said pins, a series of annularly spaced externally toothed pinions housed within said fixed part having internal threads for engagement with said threaded ends of said pins, inner and outer annular bellows which tightly connect said ring to said fixed part and between which are said springs, pins and pinions to thereby prevent contact with the corrosive fluid while allowing movement between said ring and said fixed part for seating and unseating said sealing member, and an annular driving gear mounted within said fixed part which engages said pinions for rotation thereof to cause sliding movement of said pins, whereby rotation of said gear in one direction causes rotation of said pinions geared thereto and displacement of said engaged pins toward said ring and against said annular springs to thereby move said ring and annular sealing member to its seat to cut off the flow of corrosive fluid from between the housing and the device into and through the device, and whereby rotation of said gear in the other direction causes rotation of said pinions geared thereto to thereby displace said engaged pins away from said ring and said annular springs to thereby move said ring and annular sealing member from its annular sealing seat to allow the flow of corrosive fluid from between the housing and the device into and through the device.

* * * * *